Oct. 26, 1954 W. E. WITHALL 2,692,768
FRICTION SHOCK ABSORBER FOR RAILWAY CAR TRUCKS
Filed Oct. 12, 1949
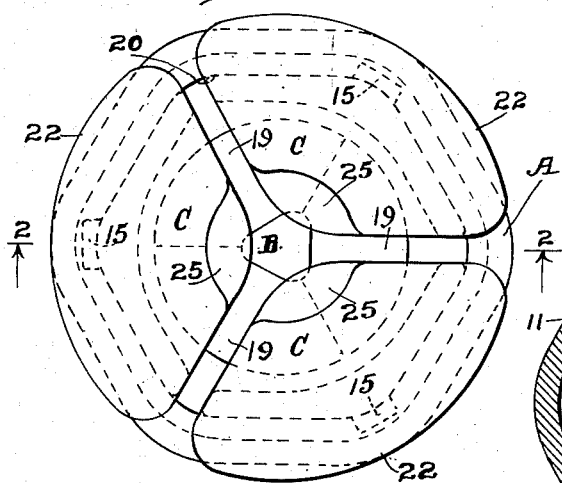
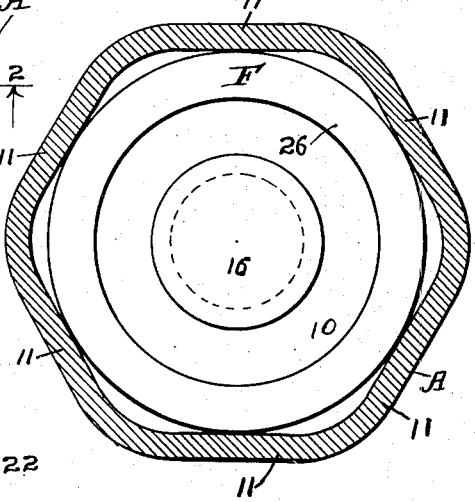
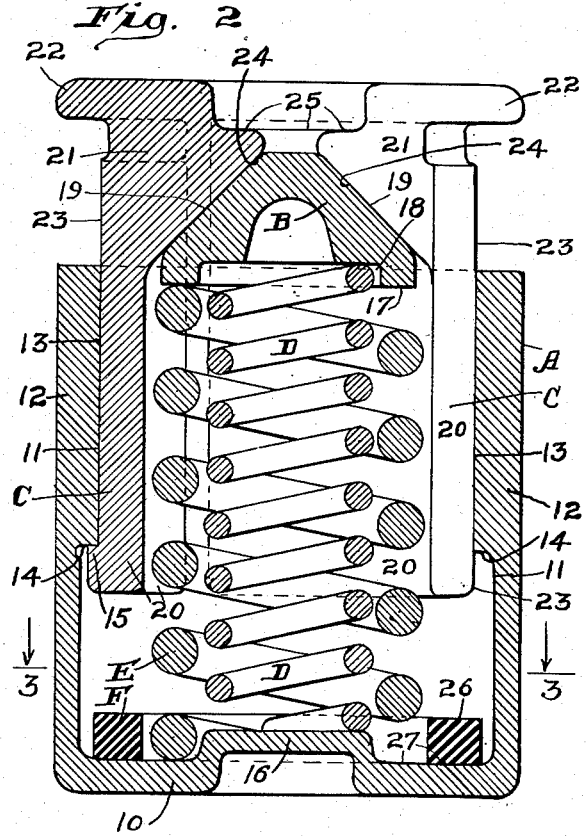
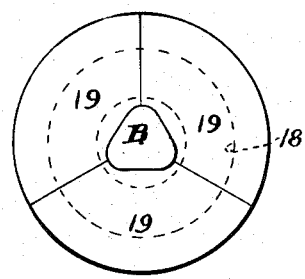
Inventor:
William E. Withall
By
Henry Fuchs
Atty.

Patented Oct. 26, 1954

2,692,768

UNITED STATES PATENT OFFICE 2,692,768

FRICTION SHOCK ABSORBER FOR RAILWAY CAR TRUCKS

William E. Withall, Hinsdale, Ill., assignor to W. H. Miner, Inc., Chicago, Ill., a corporation of Delaware Application October 12, 1949, Serial No. 120,983

7 Claims. (Cl. 267—9)

This invention relates to improvements in friction shock absorbers especially adapted for use in connection with railway car trucks for snubbing the action of truck springs.

One object of the invention is to provide a shock absorber of the character indicated, having progressively increasing frictional resistance to absorb shocks, followed by ultimate high shock absorbing capacity as the mechanism approaches the fully compressed state.

A more specific object of the invention is to provide a friction shock absorber, comprising a friction casing, friction shoes slidingly telescoped within the casing, and means for yieldingly pressing the shoes into frictional engagement with the casing, wherein means in the form of a yielding rubber member is employed to provide ultimate high capacity through compression of said member by the shoes.

Other objects of the invention will more clearly appear from the description and claims hereinafter following.

In the accompanying drawing forming a part of this specification, Figure 1 is a top plan view of my improved shock absorber. Figure 2 is a transverse, vertical sectional view, corresponding substantially to the line 2—2 of Figure 1. Figure 3 is a horizontal sectional view, corresponding to the line 3—3 of Figure 2, with the springs omitted. Figure 4 is a top plan view of the combined wedge and spring follower of my improved shock absorber.

As shown in the drawing, my improved shock absorber comprises broadly a friction casing A, a combined wedge and spring follower B, three friction shoes C—C—C, an inner coil spring D, an outer coil spring E, and a rubber ring F.

The casing A is in the form of a tubular member of hexagonal, horizontal, transverse cross section, open at its top end and having a transverse wall 10 at its bottom end. The six side walls of the hexagonal casing A are indicated by 11.

At the top end portion of the casing, the side walls are inwardly thickened to provide a friction shell section 12, presenting interior friction faces 13, adjacent faces 13—13 together forming friction surfaces of V-shaped, transverse cross section. As shown in Figure 2, the friction faces 13 extend lengthwise of the mechanism, parallel to the central longitudinal axis of the casing. At three alternate corners, the casing presents interior, horizontal stop shoulders 14—14—14 with which lugs 15—15—15 on the shoes C—C—C are engageable to limit outward movement of the shoes with respect to the casing A. The bottom wall 10 of the casing is upwardly offset at the center to provide a hollow boss 16, adapted to accommodate the usual spring centering projection of the bottom spring follower plate of the truck spring cluster of a railway car.

The combined wedge and spring follower B is in the form of a block having a flat, transverse bottom end face 17, provided with a central opening forming a seat 18 for the upper end of the spring D. The upper end portion of the block B is provided with three upwardly converging, flat wedge faces 19—19—19. The wedge faces 19—19—19 are arranged symmetrically about the central longitudinal axis of the casing and have wedging engagement with the shoes C—C—C.

The friction shoes C are three in number, annularly arranged, and interposed between the combined wedge and spring follower B and the V-shaped, interior friction surfaces of the casing. Each shoe C comprises a relatively heavy, platelike section 20 of V-shaped, transverse cross section, and an inward enlargement or head 21 at the upper end of the section 20. At the upper end thereof, the head portion 21 presents a laterally outwardly projecting flange 22, adapted to overhang the casing A. The V-shaped plate section of the shoe presents two longitudinally extending, laterally inwardly converging friction faces 23—23 on its outer side, which together form a friction surface of V-shaped, transverse cross section. The friction faces 23—23 of each shoe are engaged with two adjacent friction faces 13—13 of the casing A. The inner side of the head 21 of each shoe presents a flat wedge face 24, engaged with, and correspondingly inclined to, one of the wedge faces 19 of the combined wedge and spring follower B. The shoes C—C—C are recessed on their inner sides at the upper ends, as indicated at 25—25—25, to provide a seat for the usual spring centering lug of the top spring follower plate of a cluster of truck springs.

The springs D and E are in the forms of helical coils, the spring D being seated on the boss 16 of the casing A and having its top end engaged in the seat of the combined wedge and spring follower B. The spring F surrounds the spring D and has its top and bottom ends bearing, respectively, on the face 17 of the combined wedge and spring follower B and the wall 10 of the casing A.

The rubber ring F has flat, top and bottom faces 26 and 27 and rests on the bottom wall 10 of the casing, the annulus of the ring being substantially in vertical registration with the annularly arranged series of shoes C—C—C. As shown, the ring F is of such a thickness that the lower ends of the shoes C—C—C engage the flat top face 26 of the ring before the flanges 22—22—22 of said shoes engage the upper end of the casing; that is, the distance between the top of the casing A and the flanges 22—22—22 of the shoes is considerably greater, in the normal full release position of the mechanism, than the distance between the lower ends of the shoes and the ring F.

In assembling the mechanism, the rubber ring F, the springs D and E, and the combined wedge and spring follower B are first placed within the casing A by insertion of the parts through the open top end of the casing. The shoes C—C—C are then inserted around the combined wedge and spring follower B, with the lower ends of the shoes contracted so that the lugs 15—15—15 will pass freely between the side walls of the casing, and forced inwardly against the combined wedge and spring follower B, resisted by the springs D and E, until the lugs 15—15—15 at the lower ends of the shoes reach a position below the shoulders 14—14—14 of the casing A. The lugs 15—15—15 of the shoes are then permitted to engage beneath the shoulders 14—14—14 of the casing.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the shoes C—C—C are forced downwardly with respect to the casing A, against the combined wedge and spring follower B, resisted by the springs D and E. The shoes C—C—C are thus wedged apart by the combined wedge and spring follower B, into tight frictional engagement with the friction surfaces of the casing. During inward movement of the shoes on the friction surfaces of the casing, high frictional resistance is produced to snub the action of the truck springs. This snubbing action continues until the last phase of the compression stroke is reached, when the shoes come into engagement with and compress the rubber ring F, thereby greatly augmenting the resistance to movement of the shoes during the last part of the compression stroke. Upon recoil of the truck springs, and upward movement of the top spring plate of the truck spring cluster, the expansive action of the rubber ring F and of the springs D and E returns all of the parts to their normal positions, outward movement of the shoes being limited by engagement of the lugs thereof with the stop shoulders of the casing.

I claim:

1. In a friction shock absorber, the combination with a friction casing; of friction shoes slidingly telescoped within the casing; a combined wedge and spring follower in wedging engagement with the inner ends of said shoes; spring means between said casing and combined wedge and spring follower yieldingly opposing inward movement of said combined wedge and spring follower and shoes; and additional yielding means between said casing and shoes, said additional yielding means being free of compression during a predetermined part of the active compression stroke of the mechanism, and actively compressed between said casing and shoes during the remainder of said stroke for resisting further inward movement of said shoes.

2. In a friction shock absorber, the combination with a friction casing; of friction shoes slidingly telescoped within the casing; a combined wedge and spring follower in wedging engagement with the inner ends of said shoes; spring means between said casing and combined wedge and spring follower for yieldingly opposing inward movement of said combined wedge and spring follower and shoes; and rubber cushioning means between said casing and shoes, said additional means being free of compression during a predetermined part of the active compression stroke of the mechanism and actively compressed between said casing and shoes during the remainder of said stroke for resisting further inward movement of said shoes.

3. In a friction shock absorber, the combination with a friction casing; of friction shoes slidingly telescoped within the casing; a combined wedge and spring follower in wedging engagement with the inner ends of said shoes; spring means between said casing and combined wedge and spring follower for yieldingly opposing inward movement of the combined wedge and spring follower and shoes; and a rubber pad between said casing and shoes, spaced from said shoes in the expanded condition of the mechanism and directly engaged by said shoes during the last part of the compression stroke of the mechanism for yieldingly opposing inward movement of said shoes.

4. In a friction shock absorber, the combination with a friction casing; of elongated friction shoes telescoped within the casing for sliding movement; means within the casing yieldingly opposing inward movement of the shoes, said means including a wedge in wedging engagement with the shoes to spread the same apart, and spring means between said casing and wedge for yieldingly opposing inward movement of said wedge; and a rubber cushioning element supported within the casing in alignment with said shoes, the inner ends of said shoes being spaced from said cushioning element in the expanded condition of the mechanism, and being engageable with said cushioning element after the mechanism has been compressed to a predetermined extent, to compress said rubber cushioning element.

5. In a friction shock absorber, the combination with a friction casing having one end open and the other end closed by a transverse wall; of a plurality of elongated friction shoes slidingly telescoped within the open end of the casing, said shoes having inwardly facing wedge faces adjacent their outer ends; a spring follower having wedge faces engaged with the wedge faces of said shoes; a spring buttressed at one end against said spring follower and at its other end against the inner side of said transverse wall; and a rubber pad buttressed against the inner side of said transverse wall of the casing, the inner ends of said shoes being spaced from said pad, in full release of the mechanism, said shoes being engageable with said pad to compress the same after the mechanism has been compressed to a predetermined extent, less than the full compression stroke thereof.

6. In a friction shock absorber, the combination with a friction casing having one end open and the other end closed by a transverse wall; of a plurality of elongated friction shoes slidingly telescoped within the open end of the casing, said shoes having inwardly facing wedge faces adjacent their outer ends; a spring follower having wedge faces engaged with the wedge faces of said shoes; a spring buttressed at one end against said spring follower and at its other end against the inner side of said transverse wall; and a rubber ring buttressed against the inner side of said transverse wall of the casing, the inner ends of said shoes being spaced from said ring, in full release of the mechanism, said shoes being engageable with said ring to compress the same after the mechanism has been compressed to a predetermined extent, less than the full compression stroke thereof.

7. In a friction shock absorber, the combination with a friction casing open at its upper end and having its bottom end closed by a transverse wall; of a plurality of elongated friction shoes slidingly telescoped within the casing, said shoes having downwardly facing wedge faces at their upper ends; a follower block having wedge faces at its upper end engaging the wedge faces of said shoes; a rubber ring supported on said transverse bottom wall of the casing in vertical alignment with said shoes, said ring, in full release position of the mechanism, having its upper side spaced from the lower ends of said shoes a distance which is less than the full compression stroke of the mechanism; and spring means bearing at its top and bottom ends on said follower block and bottom wall of the casing, respectively.

References Cited in the file of this patent

UNITED STATES PATENTS

| Number | Name | Date |
|---|---|---|
| 1,620,653 | Haseltine | Mar. 15, 1927 |
| 2,156,117 | Johnson | Apr. 25, 1939 |
| 2,276,228 | Cottrell | Mar. 10, 1942 |
| 2,279,914 | Cottrell | Apr. 14, 1942 |
| 2,352,030 | Sproul | June 20, 1944 |

FOREIGN PATENTS

| Number | Country | Date |
|---|---|---|
| 469,030 | Germany | Nov. 29, 1928 |